United States Patent [19]

Matsuura et al.

[11] 4,154,915

[45] May 15, 1979

[54] PROCESS FOR PRODUCING POLYOLEFINS

[75] Inventors: Kazuo Matsuura, Kawasaki; Masaomi Matsuzaki, Yokohama; Toru Nakamura, Yokohama; Nobuyuki Kuroda, Yokohama; Mitsuji Miyoshi, Naka, all of Japan

[73] Assignee: Nippon Oil Co., Ltd., Tokyo, Japan

[21] Appl. No.: 575,788

[22] Filed: May 8, 1975

[51] Int. Cl.$^2$ .......................... C08F 4/02; C08F 10/02
[52] U.S. Cl. ................................ 526/124; 252/429 C; 526/125; 526/156; 526/352
[58] Field of Search ............. 260/88.2, 93.7, 94.9 OA, 260/94.9 E; 526/124, 125, 156

[56]  References Cited
U.S. PATENT DOCUMENTS

| | | | |
|---|---|---|---|
| 3,644,318 | 2/1972 | Diedrich et al. | 260/94.9 E |
| 3,676,414 | 7/1972 | Diedrich et al. | 260/94.9 E |
| 3,676,415 | 7/1972 | Diedrich et al. | 260/94.9 E |

FOREIGN PATENT DOCUMENTS 2137872  2/1972  Fed. Rep. of Germany.

OTHER PUBLICATIONS

Chao., Dissertation Abstracts, vol. 27, No. 11, Universty Microfilms, Inc., (May 1967), No. 67-5902.

Primary Examiner—Edward J. Smith
Attorney, Agent, or Firm—Hill, Gross, Simpson, Van Santen, Steadman, Chiara & Simpson

[57]  ABSTRACT

An improved catalyst system is disclosed for use in the polymerization or copolymerization of olefins. The catalyst comprises a transition metal compound, an organometal compound and a composite carrier. This carrier is constituted by a $SO_3$ treated alumina and a magnesium and/or a calcium compound. The polymerization or copolymerization of olefins such as ethylene, propylene and 1-butene is effected under conditions similar to those for reactions by means of Ziegler catalysts, but the resulting polyolefins have a wider molecular weight distribution, viz, a larger flow parameter as required for extrusion or blow molding.

6 Claims, No Drawings

PROCESS FOR PRODUCING POLYOLEFINS

BACKGROUND OF THE INVENTION

This invention relates to the production of polyolefins, and has particular reference to catalysts useful for the polymerization or copolymerization of olefins.

Heretofore, there have been proposed a great many catalysts in the art which comprise transition metal compounds such for example as titanium tetrachloride deposited on inorganic solid carriers including magnesium hydroxychloride, magnesium halide, magnesium hydoxide, magnesium oxide and the like. While such catalysts are reputed for their high polymerization activity, they have the disadvantage that the polyolefins produced with use of these catalysts have an extremely narrow distribution of molecular weight and hence are liable to show objectionable surface defects when extruded or blow molded. This difficulty may be overcome by providing increased molecular weight distribution of the polymerized product, whereby the flow characteristics of the resin when molded can be improved to give a fine surface finish. It is possible to provide relatively wide molecular weight distribution with use of the above-mentioned carriers by varying the polymerization temperature and choosing a particular suitable catalyst, but sufficient increase in the distribution with such prior-art carriers is difficult to achieve for the desired molding performance of the resin.

Catalyst systems are well known in the art in which certain transition metal compounds are supported on alumina or alumina-silica as disclosed for example in British Pat. No. 823,024. Such catalysts are however relatively low in their activity as compared to the aforesaid magnesium carrier catalysts and are not quite satisfactory for the polymerization of olefins because the resulting polyolefins tend to contain considerable transition metal residues and metal aluminum components and furthermore involve discoloring, deterioration, "fish-eye" and other deficiencies. With a view to eliminating such deficiencies, the present inventors have previously proposed to use a carrier obtained by treating alumina with sulfur trioxide ($SO_3$) for supporting thereon a transition metal compound, as disclosed in Japanese patent application No. 48-144364. While this type of catalyst is highly active for the polymerization of olefins, the resulting polyolefins have a relatively narrow molecular weight distribution.

Here, what is meant by wide molecular weight distribution of a polyolefin may be characterized by the following flow parameter:

$$\text{Flow parameter} = \log \frac{\text{(melt index for 21.6 kg. load)}}{\text{(melt index for 2.16 kg. load)}}$$

SUMMARY OF THE INVENTION

It is the principal object of the present invention to provide a novel catalyst useful for the polymerization of olefins, which catalyst is capable of giving high yields of polyolefins having a large flow parameter, viz, a wide molecular weight distribution.

Briefly stated, there is provided in accordance with the invention a catalyst system which comprises a solid carrier consisting of a combination of $SO_3$ (sulfur trioxide) treated alumina product (i) and magnesium and/or calcium compounds (ii), and a catalyst component consisting of titanium and/or vanadium compounds deposited on the carrier and activated by means of an organometal compound. This catalyst is intended for use in the polymerization or copolymerization of olefins so as to provide high yields of polymers having a wide molecular weight distribution, viz. a large flow parameter as required for the extrusion or blow molding thereof so that there can be obtained quality molded product having excellent flow and mechanical properties.

DETAILED DESCRIPTION OF THE PREFERRED EMBODIMENTS

The term alumina as used herein includes various kinds of alumina such as for example one obtained through thermal decomposition of aluminum alkoxide and one resulting from the calcination of a well-known crystalline or noncrystalline hydrated alumina. Calcining conditions may be selected from the well-known wide range of temperatures but should preferably be within the range of about 200°–1,000° C. The physical properties of alumina including its particle size, surface area and pore volume may also be varied depending upon the particular process chosen for alumina production so as to suit a selected application as is well known to those skilled in the art. Of course, the alumina contemplated under the invention may contain inorganic compounds of other metals such as Na, Ca, Mg, Si, and Fe depending upon the particular application for which it is intended.

The treatment of alumina with $SO_3$ according to the invention may be effected by contacting alumina with $SO_3$ in a liquid, solid or gaseous phase. A preferred example of such treatment is to contact alumina with gaseous $SO_3$ at temperatures ranging between room temperature and 1,000° C., preferably between 50° and 500° C. for a period of 1 minute to 24 hours. The amount of $SO_3$ varies with the type of alumina and the mode of reaction. However, too little $SO_3$ provides less activity of the catalyst and conversely, too much $SO_3$ would only result in wasted material. Ordinarily, $SO_3$ should be used in amounts of 0.01 to 50 mols, preferably 0.1 to 10 mols per mol of alumina ($Al_2O_3$).

The term solid compounds of magnesium as used herein which constitute part of the catalyst carrier according to the invention includes magnesium halides such as magnesium chloride and magnesium bromide; inorganic salts such as magnesium oxide, magnesium peroxide, magnesium hydroxide, magnesium hydroxychloride, magnesium carbonate, magnesium sulfate, magnesium nitrate and magnesium phosphate; mixtures of these inorganic salts with electron-donors such as alcohols, ether and amines; salts of an organic acid such as magnesium acetate, magnesium propionate and magnesium phthalate; halides of magnesium oxide; products of reaction of magnesium halide and aluminum alkoxide; products of reaction of magnesium acetate and aluminum alkoxide; and derivatives of such listed magnesium compounds. The term solid compounds of calcium includes calcium of the above listed inorganic salts, inorganic salt-electron donor adducts, salts of organic acids and derivatives thereof as well as those thermally treated. Many of these magnesium and/or calcium compounds normally contain some absorbed water or hydroxyl groups on the surface but are acceptable per se for the purpose of the invention. In the practice of the invention, the listed solid compounds may be used singularly or mixed with one another.

According to an important aspect of the invention, the ratio of the SO$_3$ treated alumina product (i) to the magnesium and/or calcium compounds (ii) is usually in the range of 500:1 to 1:50 by weight percent, preferably 200 to 1:30, more preferably 100:1 to 1:20, all depending upon the melt index and molecular weight distribution of the polymer desired. In the preparation of the catalyst systems according to the invention, the titanium and/or vanadium compounds are deposited on the composite carrier. This may be done by either first depositing these transition metal compounds on each of the two separate carrier components (i), (ii) and thereafter combining the latter together, or alternatively by combining the two carrier components together prior to the deposition of the transition metal compounds. Further alternatively, the transition metal compound or compounds are deposited on certain of the selected carrier components and thereafter admixed with others of the carrier components, followed by pulverization, or to such admixture may be further added an additional transition metal compound. Some methods of depositing catalyst components on the carriers are well known; for example, this can be effected by contacting each carrier with a titanium compound and/or a vanadium compound with heat in the presence or absence of an inert solvent, or by pulverizing the carrier together with such transition metal compound or compounds either in a liquid or solid phase. The amount of the transition metal compound to be deposited on the carrier should be so adjusted that the titanium and/or vanadium atoms contained in the resulting solid catalyst may be within the range of 0.5 to 30 percent by weight, preferably 1 to 20 percent by weight.

The transition metal compounds employed in accordance with the invention may be any titanium or vanadium compounds which can be used as Ziegler catalyst components. Illustrative are tetravalent titanium compounds such as titanium tetrachloride, titanium tetrabromide, mono-ethoxytitanium trichloride, diethoxytitanium dichloride, dibuthoxytitanium dichloride, phenoxytitanium trichloride and tetra-n-butothoxytitanium; trivalent titanium compounds such as titanium trichloride and titanium trichloridealuminum trichloride complex; trivalent vanadium compounds such as vanadium trichloride; tetravalent vanadium compounds such as vanadium tetrachloride; and pentavalent vanadium compounds such as vanadium oxytrichloride and orthoalkyl vanadate.

The polymerization reaction of olefins using the catalyst of the invention is conducted substantially in the same manner as in the polymerization reaction using a conventional Ziegler catalyst, wherein substantially oxygen- and moisture-free conditions are maintained throughout the reaction. The polymerization conditions for olefins include a temperature in the range of 20° to 300° C., preferably 50° to 180° C. and a pressure in the range of normal to 70 kg/cm$^2$, preferably 2 to 60 kg/cm$^2$. Molecular weight control may be effected to some degree by changing the polymerization conditions such as temperatures and mol ratio of the catalyst but can be more effectively done by addition of hydrogen to the polymerization system. With the catalyst of the invention, two- or more multi-stage reactions can be effected under different hydrogen concentrations, temperatures and other polymerization conditions.

The process of the invention can be applied to the polymerization of all olefins polymerizable with Ziegler catalysts and typically to the homopolymerization of alpha-olefins such as ethylene, propylene and 1-butene, or to the copolymerization of ethylene and propylene, ethylene and 1-butene, and propylene and 1-butene.

The term organometal compound as used herein includes compounds of metals of Group I-IV of the Periodic table which are generally known as Ziegler catalyst components. Preferable are organoaluminum compounds and organozinc compounds. The organoaluminum compounds are represented by the general formulae:

$$R_3Al, R_2AlX, RAlX_2, R_2AlOR, RAl(OR)_2,$$
$$RAl(OR)X \text{ and } R_3Al_2X_3$$

wherein R is alkyl or aryl group and X is halogen atom. The organozinc compounds are represented by the general formula:

$$R_2Zn$$

wherein R is alkyl group. Typical examples of such organometal compounds include triethylaluminum, triisobutylaluminum, trihexylaluminum, trioctylaluminum, tridecylaluminum, diethylaluminum chloride, ethylaluminum sesquichloride, diethylzinc, and mixtures thereof. No particular limitations are imposed upon the amount of each of these organometal compounds to be used in the process of the invention. However, the organometal compounds can usually be used in amounts of 0.1 to 1,000 mol times the transition metal compounds.

The invention will be further described by way of the following examples which are merely illustrative but are not intended to limit the invention thereto.

EXAMPLE I

(1) Preparation of catalyst component A

A commercially available hydrated alumina having a surface area of about 380m$^2$/g was calcined at 650° C. for 10 hours. 5 grams of the calcined alumina were placed in a glass tube 3.5 cm in diameter equipped with a perforated plate and maintained at 200° C., while gaseous SO$_3$ was introduced from the lower portion of the tube. 20 ml of liquid SO$_3$ were thus gasified and contacted with alumina at 200° C. This treatment was continued for 1 hour. After completion of the treatment, a purified nitrogen gas was introduced at 200° C. for 1 hour, until there was obtained a carrier having a sulfur content of 12.7 weight % in the solid. The resulting carrier was transferred to a flask equipped with stirrer, to which 80 ml titanium tetrachloride was added. The admixture was treated at 150°C. for 2 hours, and was thereafter washed with hexane. This washing was repeated until the titanium tetrachloride completely disappeared. The solid portion of the product was dried and analyzed to show that 21.5 mg titanium was deposited per gram of solid.

(2) Preparation of catalyst component B

The procedure (1) of preparing catalyst component A was followed except that a commercially available hydrated alumina (Ketjen B) was calcined at 700° C. for 16 hours in the presence of nitrogen.

The resultant SO$_3$ treated alumina contained 13.5 weight % of sulfur. Titanium tetrachloride was deposited. Analysis showed 31.2 mg titanium deposited per gram solid catalyst.

(3) Preparation of catalyst component C

The procedure (1) was followed except that a commercially available hydrated alumina (Ketjen B) was calcined at 700° C. for 16 hours in the presence of nitrogen. 1 ml $SO_3$ at room temperature was gasified and contacted with alumina at 200° C. for 1 hour thereby producing a carrier 3.9 weight % of sulfur. Titanium deposit was 28.6 mg per gram solid.

(4) Preparation of catalyst component D 9.5 g (0.1 mol) commercially available anhydrous magnesium chloride (99.9% purity treated at 350° for 20 hours in hydrogen chloride atmosphere), 4.1 g (0.025 mol) aluminum triethoxide and 0.83 g titanium tetrachloride were subjected to ball milling at room temperature for 16 hours under nitrogen atmosphere by means of a 400 ml stainless steel pot ½ inch in diameter, containing 25 stainless steel balls. There was obtained 42.1 mg titanium deposited per gram solid.

(5) Preparation of catalyst component E 10 g commercially available magnesium oxide was treated at 150° C. for 1 hour. 80 ml titanium tetrachloride was added, and the whole was heated at 150° C. for 2 hours. Upon completion of the reaction, the reaction product was washed with hexane. Washing was repeated until titanium tetrachloride disappeared. The solid portion of the product was dried and analyzed to show the deposition of 10 mg titanium per gram solid.

(6) Preparation of catalyst component F 14.2 g (0.1 mol) anhydrous magnesium acetate and 40.8 g (0.12 mol) aluminum triisopropoxide were reacted at 170°–230° C. for 10 hours in the presence of 50 ml decalin. With progress of the reaction, light distillates were removed and the solvent later was removed at reduced pressure thereby producing solid particles. The particles were washed several times with hexane and dried at reduced pressure. The resulting solid particles were added with 120 g silicon tetrachloride as a halogenating agent and heated at 100° C. for 1 hour, with unreacted materials removed with heat at reduced temperature. The solid carrier thus obtained was added with 80 ml titanium tetrachloride and heated at 150° C. for 2 hours. After completion of the reaction, the admixture was washed with hexane repeatedly until titanium tetrachloride was no longer found. The solid portion was dried and analyzed to show the deposit of 63 mg titanium per gram solid.

(7) Preparation of catalyst component G

A commercially available $CaSO_4 \cdot 2H_2O$ was heated at 150° C. under vacuum for 5 hours. Titanium tetrachloride was deposited thereon in the same manner as followed in the preparation of catalyst component E. 3.1 mg titanium was deposited per gram solid.

(8) Polymerization

A 2 liter stainless steel autoclave equipped with an induction stirrer was purged with nitrogen and charged with 1,000 ml hexane, 5 millimol triethyl aluminum, 131 mg catalyst component A and 9 mg catalyst component D. The whole was heated to 90° C. with stirring. The system was pressurized to 2 kg/cm² by the vapor pressure of hexane and nitrogen and charged with hydrogen to a total pressure of 6 kg/cm², followed by charge of ethylene to a total pressure of 10 kg/cm². The polymerization reaction was thus initiated and continued for 60 minutes with continuous supply of ethylene to maintain the total pressure at 10 kg/cm². After completion of the reaction, the polymer slurry was transferred to a beaker, and hexane was removed at reduced pressure thereby providing 102 g white polyethylene having a melt index of 0.23. The catalyst activity was represented by 182 g polyethylene per gram solid per hour per ethylene pressure, or 8040 g polyethylene per gram titanium per ethylene pressure. The flow parameter of the polyethylene produced was 1.97.

Comparing Example 1

The procedure of polymerization in Example I was followed with use of catalyst component A. There was obtained polyethylene having a melt index of 0.006 and a flow parameter of 1.87.

Comparing Example 2

The procedure of Example I was followed with use of catalyst component D except that polymerization temperature was 80° C., hydrogen partial pressure 2.4 kg/cm² and ethylene pressure 5.6 kg/cm². Polyethylene was obtained with a melt index of 0.16 and a flow parameter of 1.55.

EXAMPLE II

The procedure of Example I was followed except that 277 mg catalyst component A and 10 mg catalyst component D were used. The polymerization was continued for 1 hour. The resulting polyethylene was white in color, with a melt index of 0.10. The catalyst activity was represented by 146 g polyethylene per gram solid per hour per ethylene pressure, or 6550 g polyethylene per gram titanium per hour per ethylene pressure. The flow parameter was 2.03.

EXAMPLE III

The procedure of Example I was followed except that 521 mg catalyst component A and 10 mg catalyst component D were used.

| | |
|---|---|
| White polyethylene: | 234 g |
| Melt index: | 0.03 |
| Flow parameter: | 2.05 |
| Catalyst activity: | 110 g polyethylene per gram solid per hour per etylene pressure, or 5060 g polyethylene per gram titanium per hour per ethylene pressure. |

EXAMPLE IV

The procedure of Example I was followed except that 81 mg catalyst component B and 523 mg catalyst component E were used.

| | |
|---|---|
| White polyethylene: | 141 g |
| Melt index: | 0.22 |
| Flow parameter: | 2.01 |
| Catalyst activity: | 58 g polyethylene per gram solid per hour per ethylene pressure, or 4470 g polyethylene per gram titanium per hour per ethylene pressure. |

Comparing Example 3

The procedure of Example I was followed with use of catalyst component B alone.

| Product: | Polyethylene |
|---|---|
| Melt index: | 0.011 |
| Flow parameter: | 1.81 |

Comparing Example 4

The procedure of Example I was followed except that catalyst component E alone was used with hydrogen partial pressure of 2.4 kg/cm$^2$ and ethylene partial pressure of 5.6 kg/cm$^2$.

| Product: | Polyethylene |
|---|---|
| Melt index: | 0.32 |
| Flow parameter: | 1.73 |

EXAMPLE V

The procedure of Example I was followed except that 127 mg catalyst component B and 308 mg catalyst component E were used.

| Product: | 133 g white polyethylene |
|---|---|
| Melt index: | 0.11 |
| Flow parameter: | 2.04 |
| Catalyst activity: | 77 g polyethylene per gram solid per hour per ethylene pressure, or 4720 g polyethylene per gram titanium per hour per ethylene pressure. |

EXAMPLE VI

The procedure of Example I was followed except that 110 mg catalyst component C and 26 mg catalyst component F were used.

| Product: | 178 g white polyethylene |
|---|---|
| Melt index: | 0.25 |
| Flow parameter: | 1.93 |
| Catalyst activity: | 314 g polyethylene per gram solid per hour per ethylene pressure, or 12700 g polyethylene per gram titanium per hour per ethylene pressure. |

EXAMPLE VII

The procedure of Example I was followed except that 155 mg catalyst component C and 24 mg catalyst component F were used.

| Product: | 196 g white polyethylene |
|---|---|
| Melt index: | 0.15 |
| Flow parameter: | 1.98 |
| Catalyst activity: | 274 g polyethylene per gram solid per hour per ethylene pressure, or 10600 g polyethylene per gram titanium per hour per ethylene pressure. |

EXAMPLE VIII

The procedure of Example I was followed except that 167 mg catalyst component A and 1760 mg catalyst component G were used.

| Product: | 158 g white polyethylene |
|---|---|
| Melt index: | 0.21 |
| Flow parameter: | 2.01 |
| Catalyst activity: | 20 g polyethylene per gram solid per hour per ethylene pressure, or 4370 g polyethylene per gram titanium per hour per ethylene pressure. |

EXAMPLE IX

The procedure of Example I was followed except that 280 mg catalyst component A and 1150 mg catalyst component G were used.

| Product: | 161 g white polyethylene |
|---|---|
| Melt index: | 0.08 |
| Flow parameter: | 2.05 |
| Catalyst activity: | 28 g polyethylene per gram solid per hour per ethylene pressure, or 4180 g polyethylene per gram titaium per hour per ethylene pressure. |

EXAMPLE X 166 mg catalyst component A and 7 mg catalyst component D were used. In a manner similar to Example I, there were introduced hexane, triethyl aluminum, solid catalyst and hydrogen, followed by addition of ethylene-propylene gas containing 2 mol % propylene at 90° C. The autoclave pressure was maintained at 10 kg/cm$^2$, and the polymerization was continued for 1 hour.

| Product: | 107 g white ethylene-propylene copolymer |
|---|---|
| Melt index: | 0.21 |
| Flow parameter: | 1.95 |
| Catalyst activity: | 155 g polyethylene per gram solid per hour per ethylene pressure, or 6870 g polyethylene per gram titanium per hour per ethylene pressure. |

EXAMPLE XI

To a flask equipped with stirrer were charged 1 g SO$_3$ treated alumina (obtained as in Example I—catalyst component C) and 8 g commercially available magnesium oxide that had been heat-treated at 150° C. for 1 hour. 80 ml titanium tetrachloride was then added, and the admixture was heat-treated at 150° C. for 2 hours. After completion of the reaction, the reaction product were washed with hexane repeatedly until titanium tetrachloride disappeared. The solid portion was dried and analyzed to show a deposit of 14 mg titanium per gram solid. 280 mg of this catalyst were used for the polymerization of olefins which was effected for 1 hour in the manner described in Example I.

| Product: | 123 g white polyethylene |
|---|---|
| Melt index: | 0.41 |
| Flow parameter: | 1.97 |
| Catalyst activity: | 112 g polyethylene per gram solid per hour per ethylene pressure, or 7990 g polyethylene per gram titanium per hour per ethylene pressure. |

EXAMPLE XII

The procedure of Example XI was followed for preparing a catalyst except that 2 g SO₃ treated alumina and 7 g magnesium oxide were used, whereby there was obtained a catalyst consisting of 16 mg titanium deposited per gram solid. 341 mg of this catalyst were used for the polymerization as in Example I which was continued for 1 hour.

| Product: | 165 g white polyethylene |
|---|---|
| Melt index: | 0.23 |
| Flow parameter: | 2.05 |
| Catalyst activity: | 121 g polyethylene per gram solid per hour per ethylene pressure, or 7580 g polyethylene per gram titanium per hour per ethylene pressure. |

EXAMPLE XIII

The procedure of Example XI was followed for the preparation of a catalyst except that 1.5 g SO₃ treated alumina and 6.5 g magnesium hydroxide (which is one commercially available and heat-treated at 150° C. under vacuum for 2 hours) were used. 700 mg of this catalyst were used for the polymerization which was continued for 1 hour in a manner similar to Example I.

| Product: | 157 g white polyethylene |
|---|---|
| Melt index: | 0.09 |
| Flow parameter: | 2.03 |
| Catalyst activity: | 56 g polyethylene per gram solid per hour per ethylene pressure, or 1620 g polyethylene per gram titanium per hour per ethylene pressure. |

EXAMPLE XIV

The procedure of preparing catalyst component D was followed except that a titanium trichloride. ⅓ aluminum chloride complex was used in place of titanium tetrachloride, thereby producing catalyst component H in which 30 mg titanium was deposited per gram solid.

The procedure of polymerization in Example I was followed except that 127 mg catalyst component A and 12 mg catalyst component H obtained as above were used with 5 millimol trisobutyl aluminum added as an organometal compound.

| Product: | 165 g white polyethylene |
|---|---|
| Melt index: | 0.38 |
| Flow parameter: | 1.95 |
| Catalyst activity: | 297 g polyethylene per gram solid per hour per ethylene pressure, or 13300 g polyethylene per gram titanium per hour per ethylene pressure. |

EXAMPLE XV

The procedure of preparing catalyst component D was followed except that vanadium trichloride was used in place of titanium tetrachloride, thereby producing catalyst component I which contained 42 mg vanadium per gram solid. The procedure of polymerization in Example I was followed except that 207 mg catalyst component A and 34 mg catalyst compoent I were used.

| Product: | 181 g white polyethylene |
|---|---|
| Melt index: | 0.35 |
| Flow parameter: | 1.92 |
| Catalyst activity: | 188 g polyethylene per gram solid per hour per ethylene pressure, or 7760 g polyethylene per gram (titanium/vanadium) per hour per ethylene pressure. |

EXAMPLE XVI

The procedure of preparing catalyst component D was followed except that dibutoxydichlorotitanium was used in place of titanium tetrachloride, thereby producing catalyst component J. The procedure of Example I was followed for the polymerization of olefins with use of 130 mg catalyt component A and 9 mg catalyst component J and with 5 millimol triisobutylaluminum. The polymerization was continued for 1 hour.

| Product: | 168 g white polyethylene |
|---|---|
| Melt index: | 0.27 |
| Flow parameter: | 1.98 |
| Catalyst activity: | 302 g polyethylene per gram solid per hour per ethylene pressure, or 13200 g polyethylene per gram titanium per hour per ethylene pressure. |

What is claimed is:

1. In the process of preparing polyolefins by polymerizing or copolymerizing olefins at a temperature ranging from 20° to 300° C. and a pressure ranging from atmospheric to 70 kg/cm², the improvement which comprises effecting the polymerization or copolymerization in the presence of a catalyst system comprising:
   a transition metal compound supported on a composite carrier and an organometallic compound of a metal of the Groups I–IV of the periodic table, said transition metal compound being selected from the group consisting of tetravalent titanium compounds, trivalent titanium compounds, pentavalent vanadium compounds, tetravalent vanadium compounds, and trivalent vanadium compounds, and said carrier consisting of
   (i) a product resulting from the treatment of alumina with sulfur trioxide in an amount ranging from 0.01 to 50 moles per mol of alumina at a temperature ranging from room temperature to 1,000° C., and
   (ii) a solid compound of magnesium and/or a solid compound of calcium, wherein the ratio of (i) to (ii) is in the range of 500:1 to 1:50 by weight percent.

2. Process according to claim 1 wherein said product (i) is obtained by contacting alumina with sulfur trioxide at a temperature ranging from 50° to 500° C. for a period of 1 minute to 24 hours.

3. Process according to claim 2 wherein said sulfur trioxide is used in amounts of 0.1 to 10 mols per mol of alumina.

4. Process according to claim 1 wherein the ratio of said product (i) to said compound (ii) is in the range of 200:1 to 1:30 by weight percent.

5. Process according to claim 1 wherein the amount of said titanium and/or vanadium compound to be deposited on said composite carrier is adjusted so that the titanium and/or vanadium atoms in the catalyst system are within the range of 0.5 to 30 percent by weight.

6. Process according to claim 1 wherein said olefins are selected from the group consisting of ethylene, propylene and 1-butene.

* * * * *